C. E. BREDE.
LOCK.
APPLICATION FILED JUNE 28, 1911.
1,042,639.
Patented Oct. 29, 1912.
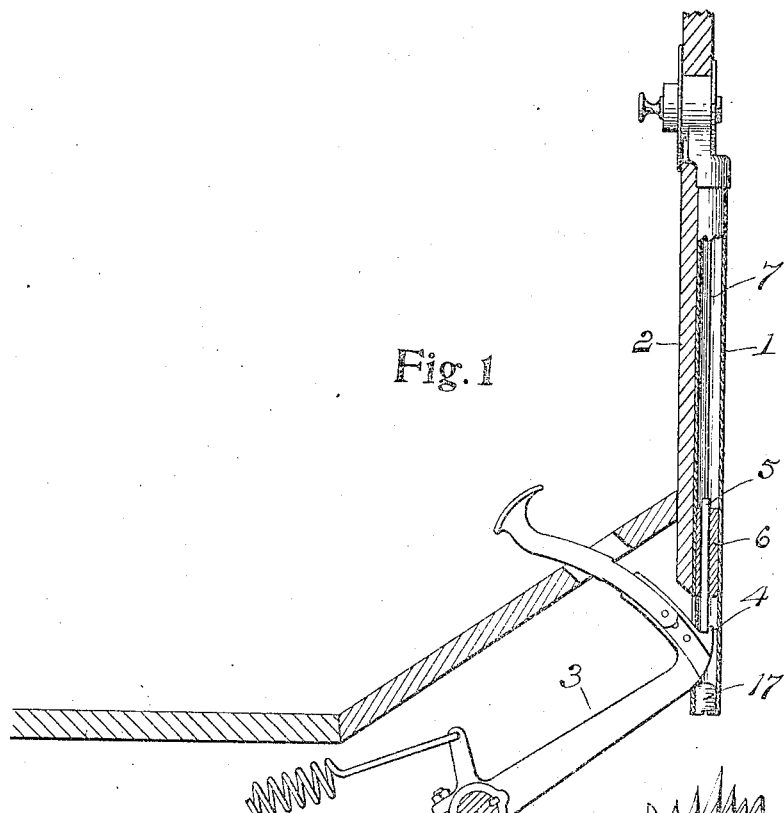
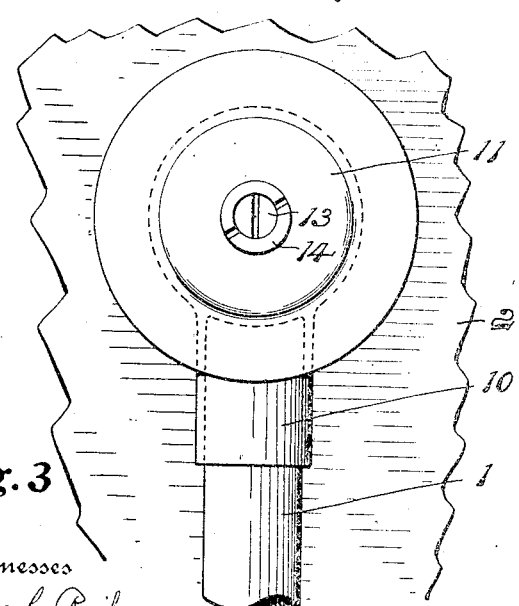
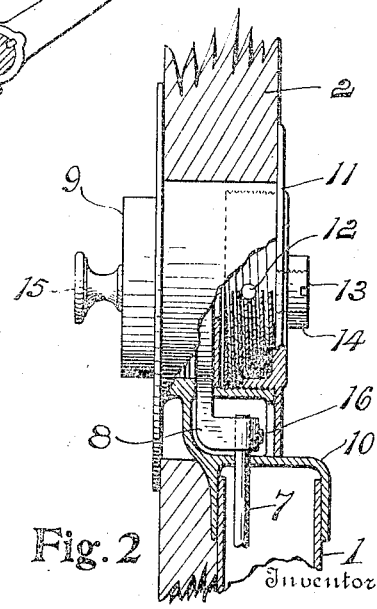
Witnesses
Anna C. Raviler
Chas. W. Stauffiger
Inventor
Carl E. Brede
By
Attorneys

UNITED STATES PATENT OFFICE.

CARL E. BREDE, OF DETROIT, MICHIGAN.

LOCK.

1,042,639.  Specification of Letters Patent.  Patented Oct. 29, 1912.

Application filed June 28, 1911. Serial No. 635,773.

*To all whom it may concern:*

Be it known that I, CARL E. BREDE, a citizen of the United States of America, residing at Detroit, in the county of Wayne and State of Michigan, have invented certain new and useful Improvements in Locks, of which the following is a specification, reference being had therein to the accompanying drawings.

This invention relates to locks for automobiles and to an arrangement thereof whereby a clutch lever or other like part may be locked in inoperative position so that the starting of the automobile engine by an unauthorized person does not in any way move the car.

The invention consists in the matters hereinafter set forth, and more particularly pointed out in the appended claims.

In the drawings, Figure 1 is a view partly in section and partly in elevation of a controlling pedal of an automobile with surrounding parts of the frame together with a locking device that embodies features of the invention; Fig. 2 is a view partially in elevation and partially broken away and in section showing a method of securing the parts in position; and Fig. 3 is a view in detail of the outer side of a lock casing.

As herein shown in preferred form, a tubular casing 1 is disposed on the dash 2 or other suitable or convenient part of an automobile chassis so that a lateral opening in its lower portion lies in the path of motion of one of the controlling pedals 3 of the vehicle. Preferably the pedal is the one which operates the clutch and the casing is so arranged in relation thereto that a knee or other part of the pedal enters the casing opening when the pedal is thrown by the operator into inoperative position, that is, in the position where the clutch or other part of the driving mechanism controlled by said lever is either disengaged or held inoperative. The lever or pedal has a lug 4 so arranged that a bar or latch 5 reciprocable in a guide block 6 in the casing lies in front of the lug when projected and prevents the movement of the pedal from inoperative position.

The latch 5 is connected by a push rod or link 7 reciprocable through the casing that is connected at its upper end to the bolt 8 of a permutation lock indicated at 9. Preferably the latter has a circular casing with depending boss or socket 10 entered by the upper end of the casing 1. The lock is retained in the dash 2 or other part by a flanged guard plate 11 screwthreaded into the outer side of the lock casing and locked in position by the bolt 12 of a key lock mounted in the plate 11 and shielded by a screw plug 13 entering a boss 14 of the plate 11 over the key hole of the lock. The main lock has the usual knob 15 and dial plate for throwing the mechanism. As a preferred detail of construction the link 7 passes through a guide aperture in an offset portion of the bolt 8, being held by a set screw 16, this construction affording slight longitudinal adjustment of the link. The lower end of the casing 1 is closed preferably by a plug 17. As a result of this construction the operator may lock the pedal in inoperative position by turning the combination knob of the lock. In permutation locks the movement of the knob through one or two divisions of the dial usually does not throw the combination so that the operator if he desires may simply turn the lock sufficiently to hold the pedal and then by revolving the handle to initial position can release the lever. A person attempting to unlock the pedal without understanding this, usually throws the combination. If, however, the operator wishes to leave the car for a considerable period of time he can by turning the knob a sufficient distance set the permutation lock so that the bolt cannot be released until the combination is worked. One of the several guards against tampering with the mechanism is the shielding of the parts entirely within the casing and the locking of the permutation casing in position so that it cannot be unbolted or unscrewed.

The screw plug effectually conceals the lock which holds the parts together so that it is not observable from the exterior and therefore the apparatus as a whole cannot be removed from the dash board.

Obviously, changes in the details of construction may be made without departing from the spirit of the invention and I do not care to limit myself to any particular form or arrangement of parts.

What I claim is:—

1. The combination with an automobile chassis, and a member oscillatory thereon for throwing transmission mechanism in and out of gear, of a lock mechanism casing on the chassis, a guard plate engaging the lock casing and securing it to the chassis, a lock holding the guard plate and casing in engaged relation, a tubular casing lying in the plane of oscillation of the member with one end secured in an opening in the lock casing and having an opening entered by said oscillatory member when the latter is in throwout position, a latch reciprocable in the tubular casing adapted to engage and hold the oscillatory member in throwout position and a lock mechanism in the lock casing operatively connected to the latch.

2. The combination with an automobile chassis and a member oscillatory thereon for throwing transmission mechanism in and out of gear, of a lock casing, a guard plate securing the lock casing to the chassis, a lock holding the guard plate and lock casing in engaged relation, a hollow casing secured at one end to the chassis by the lock casing with the other end portion having an opening adapted to be entered by the oscillatory member when the latter is in throwout position, a guide block in the hollow casing, a latch reciprocable therein adapted to engage and lock the member in throwout position, and a locking mechanism in the lock casing adapted to operate the latch.

3. The combination with an automobile chassis and a member oscillatory thereon for throwing transmission mechanism in and out of gear, of a lock casing, a guard plate screwthreaded into the lock casing and adapted to secure the latter to the chassis, a lock in the plate adapted to secure the plate and lock casing in engagement, a shield member in the plate concealing the key hole of the lock, a tubular casing secured at one end in the lock casing and provided at the other end with an opening adapted to be entered by the oscillatory member when the latter is in throwout position, a latch reciprocable in the tubular casing, and lock mechanism in the lock casing adapted to operate the latch.

4. The combination with an automobile chassis and a member oscillatory thereon for throwing transmission mechanism in and out of gear, of a permutation lock casing on the chassis provided with a depending hollow boss, a guard plate engaging the lock casing and securing it to the chassis, a key lock holding the guard plate and casing in engaged relation, a tubular casing secured at one end in the hollow boss and provided with an opening entered by the oscillatory member when the latter is in throw out position, a latch reciprocable in the tubular casing adapted to engage and hold the oscillatory member in throw out position and a permutation lock mechanism in the lock casing having a bolt linked to the latch.

In testimony whereof I affix my signature in presence of two witnesses.

CARL E. BREDE.

Witnesses:
   LEWIS E. FLANDERS,
   ANNA C. RAVILER.